United States Patent [19]
Takagi

[11] Patent Number: 4,817,498
[45] Date of Patent: Apr. 4, 1989

[54] DYNAMIC CHARACTERISTIC COMPENSATING DEVICE FOR ELECTRICAL HYDRAULIC SERVO ACTUATOR

[75] Inventor: Shigeyuki Takagi, Gifu, Japan

[73] Assignee: Teijin Seiki Co., Ltd., Osaka, Japan

[21] Appl. No.: 129,206

[22] Filed: Dec. 7, 1987

[30] Foreign Application Priority Data

Dec. 6, 1986 [JP] Japan .............................. 61-289978
Sep. 7, 1987 [JP] Japan .............................. 62-222146

[51] Int. Cl.⁴ .............................................. F15B 13/16
[52] U.S. Cl. ........................................ 91/361; 91/364; 91/367
[58] Field of Search ................. 91/361, 364, 367, 453, 91/459, 275

[56] References Cited

U.S. PATENT DOCUMENTS

| | | | |
|---|---|---|---|
| 3,738,609 | 6/1973 | Divigard | 91/361 X |
| 4,164,167 | 8/1979 | Imai et al. | 91/364 X |
| 4,328,449 | 5/1982 | Calligaris | 91/361 X |
| 4,445,421 | 5/1984 | Walker et al. | 91/361 X |

FOREIGN PATENT DOCUMENTS

| | | | |
|---|---|---|---|
| 830017 | 5/1981 | U.S.S.R. | 91/364 |
| 1000612 | 3/1983 | U.S.S.R. | 91/361 |

*Primary Examiner*—Robert E. Garrett
*Assistant Examiner*—M. Williamson
*Attorney, Agent, or Firm*—Sughrue, Mion, Zinn, Macpeak & Seas

[57] ABSTRACT

In a dynamic characteristic compensating device for an electrical hydraulic servo actuator, a differential pressure detecting piston is displaced in proportion to the difference in pressure between two hydraulic operating chambers provided on opposite sides of the main piston in the actuator, and a speed detector converts the displacement of the differential pressure detecting piston into an electrical signal. The electrical signal is fed back to the control signal input circuit side of an electrical hydraulic servo valve, to control the valve in such a manner that differential pressure variations due to disturbances applied to the actuator are canceled out by the feedback signal.

18 Claims, 4 Drawing Sheets

DYNAMIC CHARACTERISTIC COMPENSATING DEVICE FOR ELECTRICAL HYDRAULIC SERVO ACTUATOR

BACKGROUND OF THE INVENTION

This invention relates to an electrical hydraulic servo actuator, and more particularly to a dynamic characteristic compensating device therefor. Still more particularly, the invention relates to such a compensation device utilizing a pressure feedback technique.

It is desirable that a servo mechanism respond with a high degree of accuracy to a large change in a controlled value, but that it not respond to disturbances in the controlled value. Heretofore, electrical hydraulic servo actuators have been provided with a dynamic characteristic compensating device for the purpose of stabilizing the system against disturbances. The dynamic characteristic compensating device operates according to a so-called "pressure feedback technique" in which the variation in pressure of the hydraulic operating chamber of the actuator is detected and differentiated, and the differentiated signal is then employed as a feedback signal for the input signal, so that the variation in pressure is cancelled out.

Such dynamic characteristic compensating devices can be grouped into two classes. Devices of the first class are purely hydraulically operated. More specifically, in the device of the first class, as shown in FIG. 3, an actuator 100 defines a hydraulic operating chamber 103, and an orifice 102 is provided in a passageway between the actuator 100 and a cushion chamber 101 to hydraulically convert the variation in pressure of the hydraulic operating chamber 103 into a differential hydraulic signal. The differential hydraulic signal thus formed is utilized to operate a leakage valve 104 or a feedback link (not shown).

Compensating devices of the second class are electrically operated. More specifically, as shown in FIG. 4, the pressure in a hydraulic operating chamber 201 defined by an actuator 200 is converted into an electrical signal by means of strain gauges 202, and the electrical signal thus obtained is fed back to an electrical input signal section (a combination circuit 206 which may be an adder or a subtractor depending on the polarities of its input signals) through a demodulator 203, a filter 204 and a differentiator 205.

However, the purely hydraulic compensating device is disadvantageous in the following aspects. A first disadvantage is attributable to the orifice 102. More particularly, when air, which is unavoidably mixed in the operating oil, is pooled at the orifice 102, an extremely large error signal results, thus making the system unstable. Further, since the device requires a leakage valve 104 or a pressure feedback plunger, the device is necessarily intricate in construction, and the leakage valve or pressure feedback plunger is liable to become inoperable directly or indirectly due to foreign matter mixed in the operating oil. Thus, the conventional hydraulically-operated dynamic characteristic compensating device is low in reliability and intricate in construction.

The electrically-operated dynamic characteristic compensating device is also disadvantageous in the following aspects. First, since the output signal of the strain gauge 202 is weak, the device is liable to be affected by noise, i.e., it is low in reliability. Furthermore, the device is also intricate in construction because it is necessary to provide a power source for driving the auxiliary electronic units such as the demodulator 203.

SUMMARY OF THE INVENTION

Accordingly, an object of this invention is to eliminate the above-described difficulties accompanying a conventional dynamic characteristic compensating device for an electrical hydraulic servo actuator.

More specifically, an object of the invention is to eliminate the above-described difficulties accompanying a conventional dynamic characteristic compensating device for an electrical hydraulic servo actuator.

More specifically, an object of the invention is to provide a dynamic characteristic compensating device for an electrical hydraulic servo actuator which is high in reliability and simple in construction.

The foregoing object and other objects of the invention have been achieved by the provision of a dynamic characteristic compensating device for an electrical hydraulic servo actuator which comprises: a differential pressure detecting piston which is displaced in proportion to a difference in pressure between hydraulic operation chambers provided on both sides of the main piston in an actuator; and a speed detector for converting a speed of the differential pressure detecting piston into an electrical signal, which is fed back to the control signal input circuit side of an electrical hydraulic servo valve.

The manner in which the foregoing object and other objects are achieved by this invention will become more apparent from the following detailed description and the appended claims when read in conjunction with the accompanying drawings.

BRIEF DESCRIPTION OF THE DRAWINGS

The invention will be more clearly understood from the following description in conjunction with the accompanying drawings, in which.

DETAILED DESCRIPTION OF THE PREFERRED EMBODIMENTS

Preferred embodiments of this invention will now be described with reference to the accompanying drawings.

Figure 1:
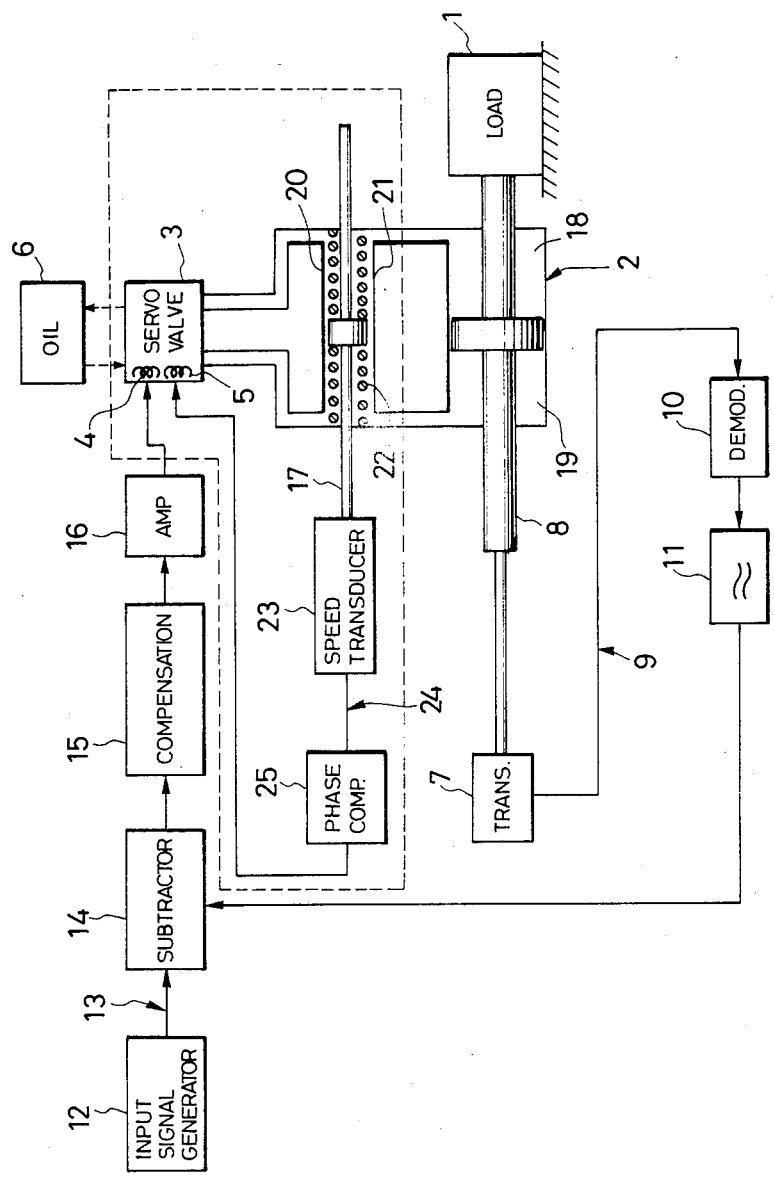
FIG. 1 is an explanatory diagram, partly as a block diagram, showing the arrangement of a first embodiment of this invention.

FIG. 1 shows a first embodiment of the invention which is applied to a system with an electrical hydraulic servo valve with an auxiliary control coil. This type of system is sometimes referred to as a "dual coil type electrical hydraulic servo valve."

In FIG. 1, reference numeral 1 designates a load to be controlled. The load 1 is driven by a hydraulic actuator 2. The flow rate and the direction of pressurized oil applied to the actuator 2 is controlled by an electrical hydraulic servo valve 3. The servo valve has a main control coil 4 and an auxiliary control coil 5 for operating a flapper (not shown).

Further in FIG. 1, reference numeral 6 designates an oil pressure source for supplying operating oil to and receiving it from the servo valve 3; 7 designates a differential transformer (LVDT) operating as a position detector for detecting the position of the output piston 8 of the actuator 2; 9 designates a position feedback circuit for transmitting the output position signal of the differential transformer 7, the circuit 9 including a demodulator 10 and a filter 11; and 12 designates an input signal generator. The input signal generated by the input signal generator 12 is applied through an input circuit 13 which includes a subtractor 14 for calculating the difference between the input signal provided by the input signal generator 12 and the output signal of the position feedback circuit 9, a response compensating element 15 for compensating for the transmission delay of the servo valve 15, and a servo amplifier 16.

Further in FIG. 1, reference numeral 17 designates a differential pressure detecting piston which is liquid-tightly and slidably fitted in a cylinder 20 so as to be displaced in proportion to the difference between the pressures in two hydraulic operating chambers 18 and 19 which are provided on respective sides of the piston 8. The elastic forces of springs 21 and 22 are applied to the piston 17 so that the latter is held at the neutral position in the absence of a pressure differential. The piston 17 is displaced by the pressure difference described above, and the speed of displacement is converted by a speed transducer 23 into an electrical signal for detection. The detection of the speed of the differential pressure detecting piston 17 is equivalent to the detection of the differential value of the variation of the above-described differential pressure.

The electrical signal provided by the speed transducer 23 is applied through a pressure feedback circuit 24 to the auxiliary control coil 5 which is provided on the control signal input circuit side of the servo valve 3. The pressure feedback circuit 24 is connected to the auxiliary control coil 5 in such a manner that the magnetic flux of the main control coil 4 is decreased. The pressure feedback circuit 24 includes a phase compensating coil 25 for compensating the stability of the system in a predetermined load frequency range.

Figure 5:
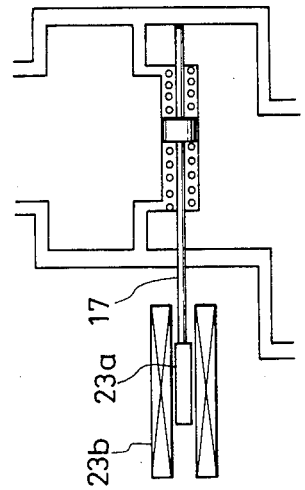
FIG. 5 is an explanatory diagram showing a speed transducer in FIG. 1.
Figure 3:
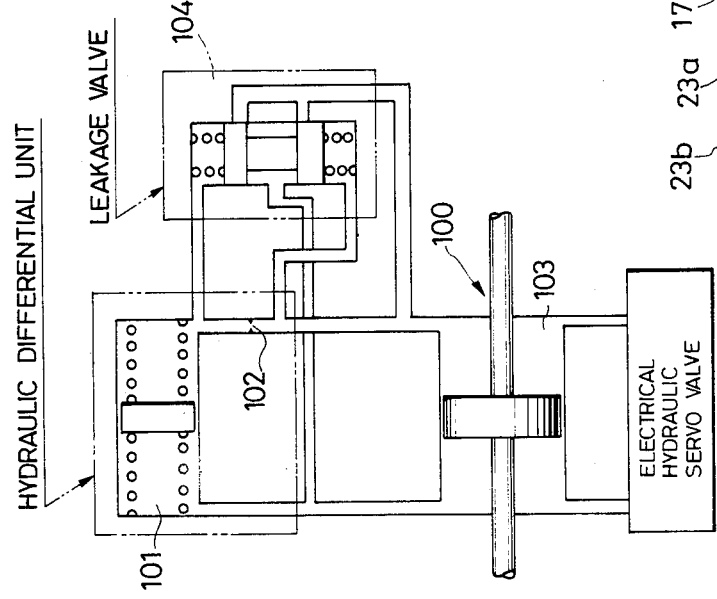

The speed transducer 23, as shown in FIG. 5, comprises a magnet 23a and a coil 23b. The slight movement of the differential pressure detecting piston 17 is transmitted to the magnet 23a, and the movement of the magnet 23a induces an electromagnetic force in the coil 23b. Thus, the movement of the piston 17 is converted into an electrical signal.

The operation of the first embodiment thus organized is as follows. An instruction signal provided by the input signal generator 12 is applied through the servo amplifier 16 and other circuit elements to the main control coil 4 of the servo valve 3, to activate the valve 3. As a result, the fluid of the oil pressure source 6 is allowed to flow into and out of the actuator 2, i.e., the actuator 2 is operated. The displacement of the piston 17 in the actuator 2 is detected as an electrical signal by the position detector 7. The electrical signal is fed back to the subtractor 14. Thus, the actuator 2 operates according to the aforementioned instruction signal. In this operation, it is preferable that the actuator 2 completely follows the instruction signal and is free from disturbances, inertial forces, etc. which are applied thereto.

However, in practice, these factors act to lower the response and the stability of the system.

For instance, when a disturbance is applied to the actuator 2, the differential pressure of the oil operating chambers 18 and 19 provided respectively on both sides of the output piston 8 is affected in correspondence to the disturbance, thus making the operation of the actuator unstable. The variation of the differential pressure is transmitted to the differential pressure detecting piston 17 so as to displace the piston 17. When the piston 17 is displaced in this manner, its displacement speed, i.e., the differential value of the differential pressure variation mentioned above, is detected as an electrical signal by the speed transducer 23. The electrical signal is fed back to the auxiliary control coil 5 of the servo valve 3 through the phase compensating coil 25. This feedback signal controls the servo valve so that the differential pressure variation due to the disturbance is canceled out. As a result, the system is stabilized.

In the embodiment described above, the differential pressure variation is converted into a differential signal by using the differential pressure detecting piston instead of the cushion chamber and the orifice in the conventional hydraulic differentiating device. The invention is therefore immune to the problem of extremely large error signals caused by air mixed in the operating oil. Furthermore, in the invention, what is driven by the differential signal is the auxiliary control coil 5 of the servo valve 3 instead of the pressure feedback plunger or leakage valve in the conventional hydraulically-operated dynamic characteristic compensating device. Accordingly, the device of the invention is simple in construction, and is free from the difficulty of inoperability caused by foreign matter mixed in the operating oil. Thus, the device of the invention is simple in construction, and high reliability when compared with the conventional device using the hydraulic differentiating device.

When the pressure receiving area of the piston 17 and the elastic forces of the springs 21 and 22 are set to suitable values, the displacement of the differential pressure detecting piston is much larger than that in the case where the strain gauges are used under the same differential pressure, and accordingly the output current of the speed transducer 23 is also larger. Thus, in the device of the invention, unlike the conventional compensating device using electrical differentiation, the effects of noise can be largely disregarded, and the demodulator and the filter can be eliminated. Accordingly, the dynamic characteristic compensating device of the invention is simpler in construction and higher in reliability than the conventional compensating device using electrical differentiation.

As described above, the output current of the speed transducer can be increased. More specifically, it can be increased to several milli-amperes, which is substantially equal to the drive current of the servo valve 3. Accordingly, the output signal of the speed transducer 23 can be fed back directly to the auxiliary control coil 5 of the servo valve 3. This will permit an improvement in the reliability of the entire system.

Figure 2:
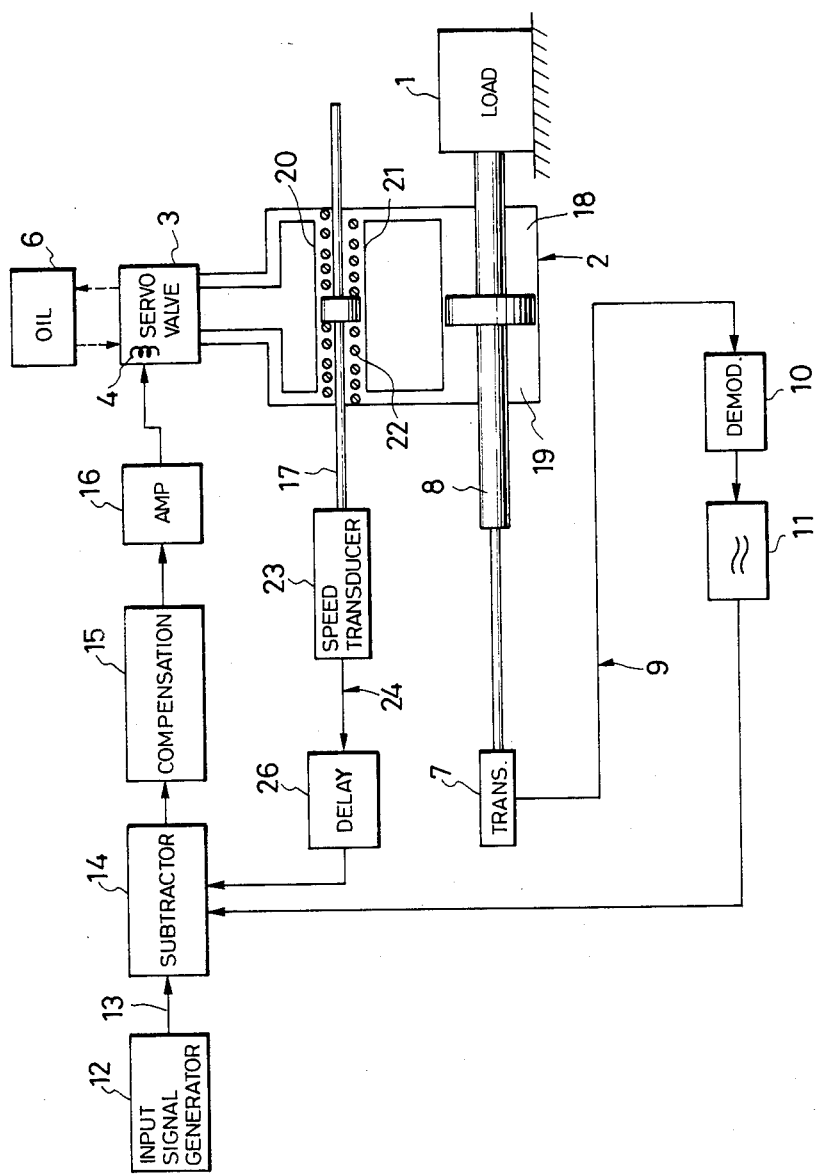
FIG. 2 is an explanatory diagram, partly as a block diagram, showing the arrangement of a second embodiment of the invention.
Figure 4:
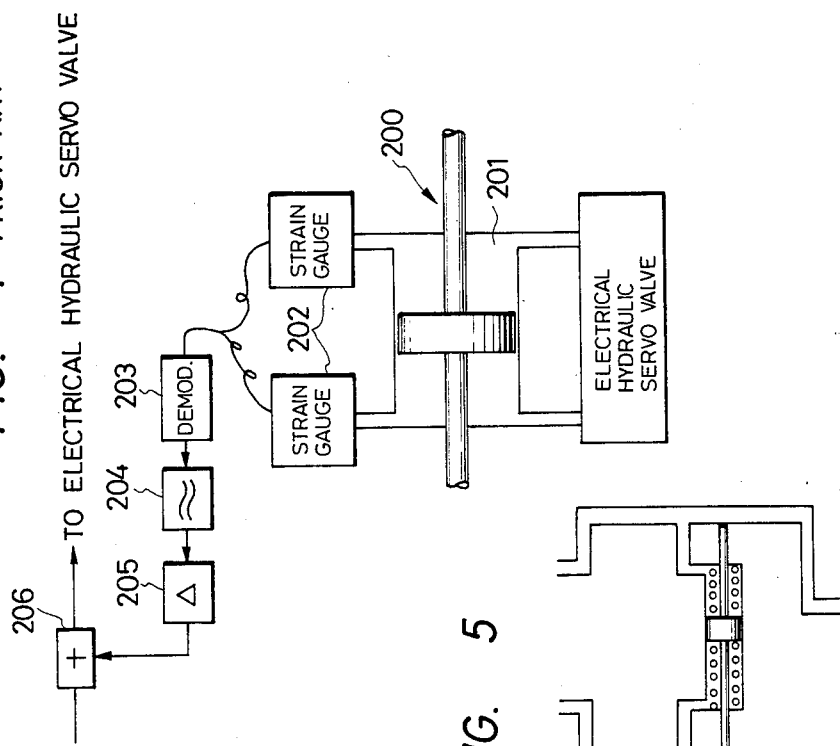
FIGS. 3 and 4 are explanatory diagrams, partly as block diagrams, showing examples of a conventional dynamic characteristic compensating device for an electrical hydraulic servo actuator.

FIG. 2 shows the arrangement of a second embodiment of the invention. In FIG. 2, those components which have been previously described with reference to FIG. 1 are therefore designated by the same reference numerals.

In the second embodiment, unlike the first embodiment, the servo valve 3 has no auxiliary control coil 5.

Instead, the output signal of the speed transducer 23 is applied to the subtractor 14 provided on the control signal input circuit side of the servo valve 3, and the pressure feedback circuit 24 includes a primary delay circuit 26 for compensating the stability of the system in a predetermined load frequency range.

The operation of the second embodiment is substantially similar to that of the first embodiment shown in FIG. 1.

Figure 6:
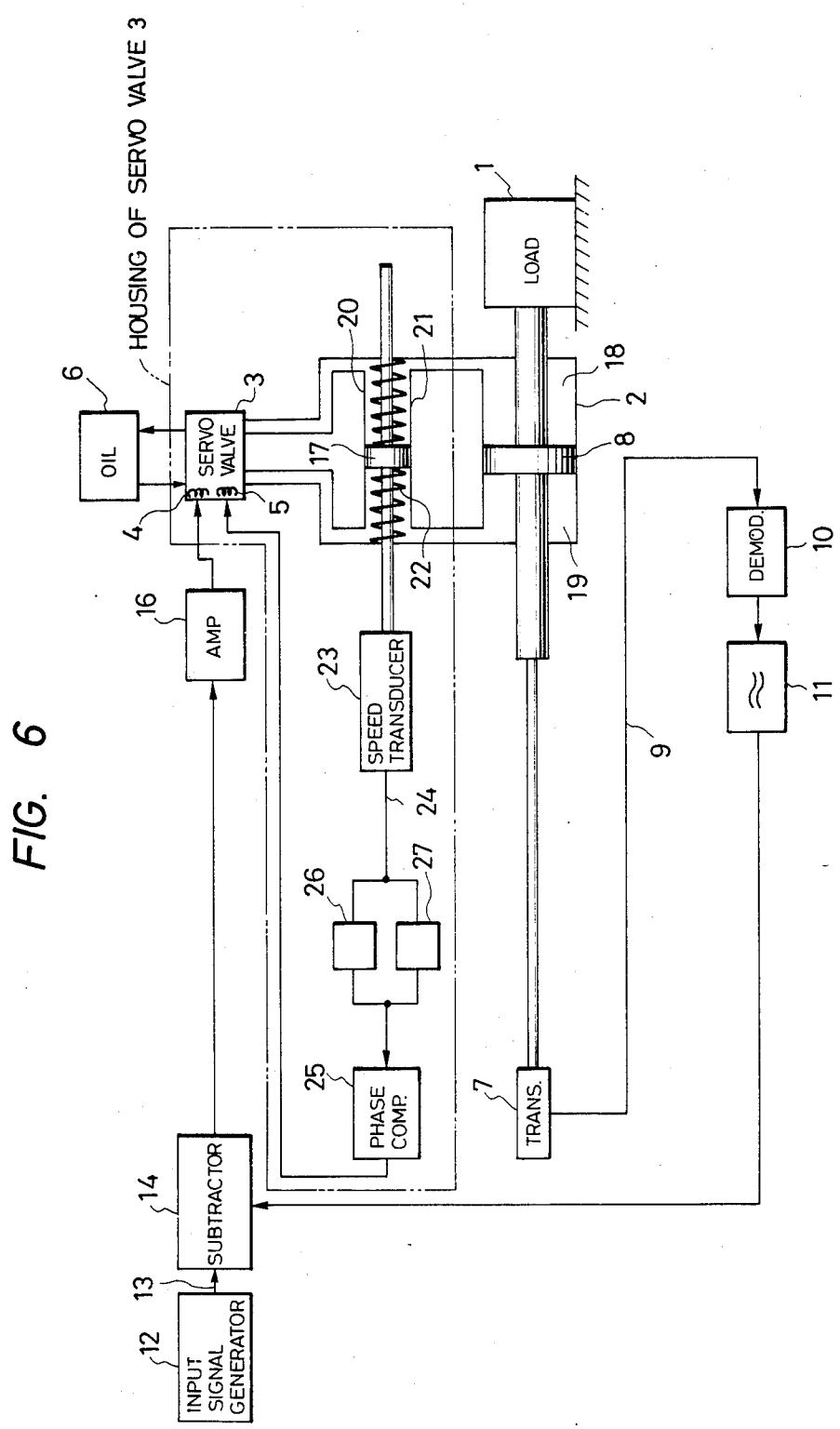
FIG. 6 is an explanatory diagram, partly as a block diagram, showing a third embodiment of the invention.

FIG. 6 shows a third embodiment of the invention. In FIG. 6, those components which have been previously described with reference to FIG. 1 are therefore designated by the same reference numerals.

In the third embodiment, the pressure feedback circuit 24 includes the phase compensating coil 25, a temperature compensating thermistor 26, and a gain adjusting resistor 27, and therefore the stability of the hydraulic servo system can be maximized even when the ambient temperature changes over a wide range. Furthermore, since the resistor and the thermistor are small parts, the resistor, the thermistor, the phase compensating coil, and the speed transducer can all be combined with the electrical hydraulic servo valve in the form of one unit. This will permit miniaturization of the dynamic characteristic compensating device, and will also permit utilization of shielding to thereby protect the device from the effects of noise.

As described above, in the dynamic characteristic compensating device of the invention, the speed of movement of the differential pressure detecting piston is detected to read the differential pressure of the hydraulic operating chambers provided on respective sides of the main piston in the actuator. Therefore, the device is free from the difficulty that an extremely large error signal is produced because of air mixed in the operating oil. Since the differential value thus read is fed back as an electrical signal to the control signal input circuit side of the electrical hydraulic servo valve, the device needs no mechanically driven means such as a leakage valve, and therefore the device is free from the difficulty that foreign matter in the operating oil will render the mechanically driven means inoperable.

Furthermore, in the device of the invention, a differential pressure detecting piston having a large displacement is used for detection of the differential value of the differential pressure variation, with the speed of displacement is converted into the electrical signal by means of the speed detector. Accordingly, the output current of the speed detector is much larger than that provided by a strain gauge for the same differential pressure. Therefore, the dynamic characteristic compensating device of the invention, unlike the conventional device with an electrical differentiating device using strain gauges or the like, can disregard the effects of noise, and can eliminate the demodulator and the filter.

Thus, the dynamic characteristic compensating device of the invention is much simpler in construction and higher in reliability than a conventional device.

What is claimed is:

1. A dynamic characteristic compensating device for an electrical hydraulic servo actuator of the type having a main piston with first and second chambers on respective sides thereof and an electrical hydraulic servo valve for controlling the pressure in said first and second chambers in accordance with a control signal received at a control input side, said device comprising:
   a differential pressure detecting member mechanically independent of said main piston;
   means for displacing said member in accordance with a difference in pressure between said first and second chambers;
   speed detecting means for generating an electrical signal representing the speed of movement of said member; and
   feedback means for feeding said electrical signal back to said control input side of said valve as a feedback signal for cooperating with said control signal to control said servo valve.

2. An electrical hydraulic servo actuator of the type having a main piston with first and second chambers on respective sides thereof and an electrical hydraulic servo valve for controlling the pressure in said first and second chambers in accordance with a control signal received at a control input side, said servo actuator further including a dynamic characteristic compensating device comprising:
   a differential pressure detecting member mechanically independent of said main piston;
   means for displacing said member in accordance with a difference in pressure between said first and second chambers;
   speed detecting means for generating an electrical signal representing the speed of movement of said member; and
   feedback means for feeding said electrical signal back to said control input side of said valve as a feedback signal for cooperating with said control signal to control said servo valve.

3. A dynamic characteristic compensating device for an electrical hydraulic servo actuator of the type having a main piston with first and second chambers on respective sides thereof and an electrical hydraulic servo valve for controlling the pressure in said first and second chambers in accordance with a control signal received at a control input side, said valve including an auxiliary control coil for receiving a feedback signal, said device comprising:
   a differential pressure detecting member;
   means for displacing said member in accordance with a difference in pressure between said first and second chambers;
   speed detecting means including a speed transducer for generating an electrical signal representing the speed of movement of said member; and
   feedback means, including a phase compensating coil, for feeding said electrical signal back to said control input side of said valve as said feedback signal for cooperating with said control signal to control said servo valve.

4. A dynamic characteristic compensating device for an electrical hydraulic servo actuator of the type having a main piston with first and second chambers on respective sides thereof and an electrical hydraulic servo valve for controlling the pressure in said first and second chambers in accordance with a control signal received at a control input side, said device comprising:
   a differential pressure detecting member;
   means for displacing said member in accordance with a difference in pressure between said first and second chambers;
   speed detecting means for generating an electrical signal representing the speed of movement of said member; and feedback means for feeding said electrical signal back to said control input side of said valve as a feedback signal for cooperating with said control signal to control said servo valve, said feedback means including a delay element for delaying said electrical signal and a combining circuit for combining the delayed electrical signal with an input signal to produce said control signal.

5. A dynamic characteristic compensating device for an electrical hydraulic servo actuator of the type having a main piston with first and second chambers on respective sides thereof and an electrical hydraulic servo valve for controlling the pressure in said first and second chambers in accordance with a control signal received at a control input side, said control input side of said valve including an auxiliary control coil for receiving a feedback signal, said device comprising:
a differential pressure detecting member;
means for displacing said member in accordance with a difference in pressure between said first and second chambers;
speed detecting means for generating an electrical signal representing the speed of movement of said member; and
feedback means for feeding said electrical signal back to said control input side of said valve as said feedback signal for cooperating with said control signal to control said servo valve, said feedback means comprising a gain adjusting resistor and a temperature compensating thermistor connected between said speed detecting means and said auxiliary control coil.

6. A device as claimed in claim 5, wherein said resistor and thermistor are contained together with said servo valve within a servo valve housing.

7. A device as claimed in claim 6, wherein said feedback means further comprises a phase compensating coil connected between said speed detecting means and said auxiliary control coil.

8. A device as claimed in claim 7, wherein said speed detecting means, resistor, thermistor, phase compensating coil and electrical hydraulic servo valve form one unit.

9. A dynamic characteristic compensating device for an electrical hydraulic servo actuator of the type having a main piston with first and second chambers on respective sides thereof and an electrical hydraulic servo valve for controlling the pressure in said first and second chambers in accordance with a control signal received at a control input side, said device comprising:
a differential pressure detecting member, including a differential pressure detecting piston which displaces in accordance with a difference in pressure between said first and second chambers;
speed detecting means for generating an electrical signal representing the speed of movement of said member; and
feedback means for feeding said electrical signal back to said control input side of said valve as a feedback signal for cooperating with said control signal to control said servo valve.

10. An electrical hydraulic servo actuator of the type having a main piston with first and second chambers on respective sides thereof and an electrical hydraulic servo valve for controlling the pressure in said first and second chambers in accordance with a control signal received at a control input side, said valve including an auxiliary control coil for receiving a feedback signal, said servo actuator further including a dynamic characteristic compensating device comprising:
a differential pressure detecting member;
means for displacing said member in accordance with a difference in pressure between said first and second chambers;
speed detecting means including a speed transducer for generating an electrical signal representing the speed of movement of said member; and
feedback means, including a phase compensating coil, for feeding said electrical signal back to said control input side of said valve as said feedback signal for cooperating with said control signal to control said servo valve.

11. An electrical hydraulic servo actuator of the type having a main piston with first and second chambers on respective sides thereof and an electrical hydraulic servo valve for controlling the pressure in said first and second chambers in accordance with a control signal received at a control input side, said servo actuator further including a dynamic characteristic compensating device comprising:
a differential pressure detecting member;
means for displacing said member in accordance with a difference in pressure between said first and second chambers;
speed detecting means for generating an electrical signal representing the speed of movement of said member; and
feedback means for feeding said electrical signal back to said control input side of said valve as a feedback signal for cooperating with said control signal to control said servo valve, said feedback means including a delay element for delaying said electrical signal and a combining circuit for combining the delayed electrical signal with an input signal to produce said control signal.

12. An electrical hydraulic servo actuator of the type having a main piston with first and second chambers on respective sides thereof and an electrical hydraulic servo valve for controlling the pressure in said first and second chambers in accordance with a control signal received at a control input side, said control input side of said valve including an auxiliary control coil for receiving a feedback signal, said servo actuator further including a dynamic characteristic compensating device comprising:
a differential pressure detecting member;
means for displacing said member in accordance with a difference in pressure between said first and second chambers;
speed detecting means for generating an electrical signal representing the speed of movement of said member; and
feedback means for feeding said electrical signal back to said control input side of said valve as a feedback signal for cooperating with said control signal to control said servo valve, said feedback means comprising a gain adjusting resistor and a temperature compensating thermistor connected between said speed detecting means and said auxiliary control coil.

13. An actuator as claimed in claim 12, wherein said resistor and thermistor are contained together with said servo valve within a servo valve housing.

14. An actuator as claimed in claim 13, wherein said feedback means further comprises a phase compensating coil connected between said speed detecting means and said auxiliary control coil.

15. An actuator as claimed in claim 14, wherein said speed detecting means, resistor, thermistor, phase compensating coil and electrical hydraulic servo valve form one unit.

16. An electrical hydraulic servo actuator of the type having a main piston with first and second chambers on respective sides thereof and an electrical hydraulic servo valve for controlling the pressure in said first and second chambers in accordance with a control signal received at a control input side, said servo actuator further including a dynamic characteristic compensating device comprising:
  a differential pressure detecting member comprising a differential pressure detecting piston which displaces in accordance with a difference in pressure between said first and second chambers;
  speed detecting means for generating an electrical signal representing the speed of movement of said member; and
  feedback means for feeding said electrical signal back to said control input side of said valve as a feedback signal for cooperating with said control signal to control said servo valve.

17. A dynamic characteristic compensating device for an electrical hydraulic servo actuator of the type having a main piston with first and second chambers on respective sides thereof and an electrical hydraulic servo valve for controlling the pressure in said first and second chambers in accordance with a position control signal received at a control input side, said device comprising:
  a differential pressure detecting member;
  means for displacing said member in accordance with a difference in pressure between said first and second chambers;
  speed detecting means for generating an electrical signal representing the speed of movement of said member; and
  feedback means for feeding said electrical signal back to said control input side of said valve as a feedback signal for cooperating with said position control signal to control said servo valve.

18. An electrical hydraulic servo actuator of the type having a main piston with first and second chambers on respective sides thereof and an electrical hydraulic servo valve for controlling the pressure in said first and second chambers in accordance with a position control signal received at a control input side, said servo actuator further including a dynamic characteristic compensating device comprising:
  a differential pressure detecting member;
  means for displacing said member in accordance with a difference in pressure between said first and second chambers;
  speed detecting means for generating an electrical signal representing the speed of movement of said member; and
  feedback means for feeding said electrical signal back to said control input side of said valve as a feedback signal for cooperating with said position control signal to control said servo valve.

* * * * *